No. 829,423.  
PATENTED AUG. 28, 1906.
W. B. PARRISH.  
FERTILIZER DISTRIBUTER.  
APPLICATION FILED JUNE 23, 1906.
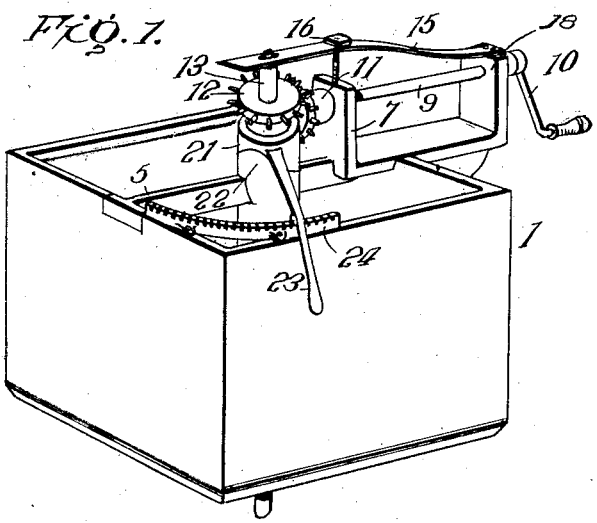
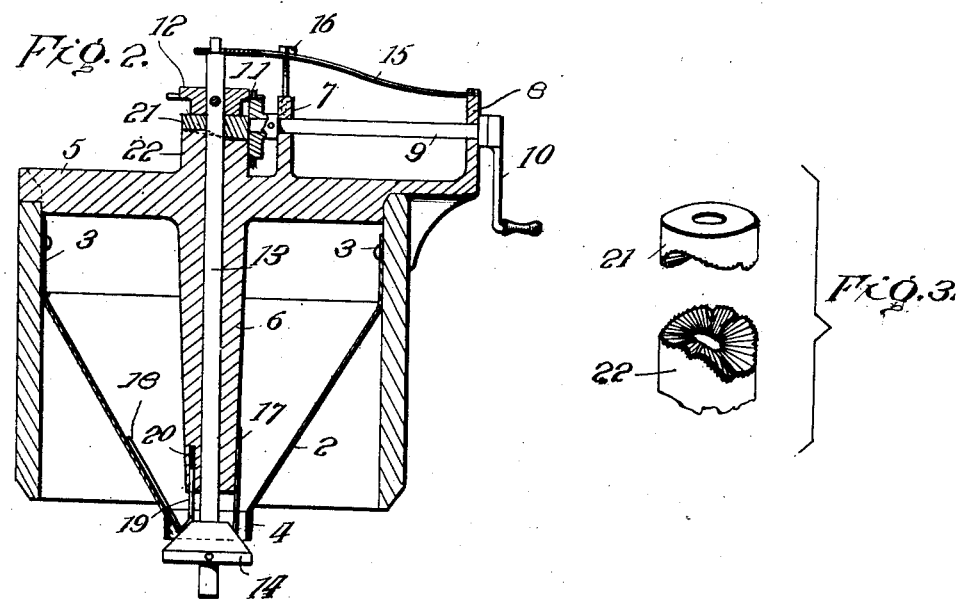
Witnesses  
Inventor  
W. B. Parrish.  
By Macey, Attorneys

UNITED STATES PATENT OFFICE.

WASHINGTON B. PARRISH, OF KARA, VIRGINIA.

FERTILIZER-DISTRIBUTER.

No. 829,423.     Specification of Letters Patent.     Patented Aug. 28, 1906.

Application filed June 23, 1906. Serial No. 323,148.

*To all whom it may concern:*

Be it known that I, WASHINGTON B. PARRISH, a citizen of the United States, residing at Kara, in the county of Lunenburg and State of Virginia, have invented certain new and useful Improvements in Fertilizer-Distributers, of which the following is a specification.

This invention provides means specially designed for distributing fertilizer and which may be utilized for dropping seed, the purpose being to insure a positive feed of the material in regulated quantity and to admit of adjusting the discharge from a comparatively small outlet to a large opening.

The invention resides most particularly in the novel structure of the device and in the means whereby the discharge-outlet is regulated.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a fertilizer-distributer embodying the invention. Fig. 2 is a vertical central sectional view thereof. Fig. 3 is a detail view of a modification, showing interlocking teeth between the coöperating cams, whereby the discharge-outlet is regulated.

Corresponding and like parts are referred to in the following description and indicated in all the views of the drawings by the same reference characters.

The hopper for containing fertilizer or other material to be distributed comprises a body portion 1 and a bottom 2. In the event of the body 1 being of square form, as illustrated, the bottom 2 is preferably made separate therefrom and of conical form, so as to direct the fertilizer to a central point at which the discharge-opening is provided. The body portion 1 may be formed of wood, the straight sides being joined in any convenient and substantial way. The conical bottom 2 is preferably constructed of sheet metal bent into the form substantially as shown and having extensions 3 at opposite points to receive the fastening means employed for connecting the bottom to the body. A rim or flange 4 is pendent from the bottom and surrounds the discharge-opening thereof. The bottom 2 is preferably arranged within the lower portion of the body, so as to be protected thereby.

A cross-bar 5 is arranged at the upper end of the hopper and is provided with a bearing 6, which is arranged to extend within the hopper and preferably tapered throughout its length, said bearing terminating a short distance from the lower end of the bottom 2. The cross-bar is extended at one end beyond the hopper and is provided with uprights 7 and 8, in which a horizontal shaft 9 obtains a bearing. Rotary movement may be imparted to the horizontal shaft from any suitable source of power in any convenient way, and for this purpose said shaft is provided at its outer end with a crank-handle 10 to admit of rotating the shaft by hand. A gear-wheel 11, fast to the inner end of the horizontal shaft 9, is adapted to mesh with a companion gear-wheel 12, fast to the upper end of a vertical shaft 13, which is mounted in the bearing 6, and provided at its lower end with a regulator and spreader 14. The vertical shaft 13 is mounted in the bearing 6, so as to receive both a rotary and a longitudinal movement therein, the latter movement serving to vary the size of the outlet, whereby the discharge of the fertilizer or other material is regulated.

The combined regulator and spreader 14 is secured to the vertical shaft 13, so as to rotate and move therewith, and its upper side is made conical, so as to facilitate the discharge of the material and prevent lodging thereof upon the upper side of the said part 14. A spring 15 exerts a downward pressure on the vertical shaft 13 and is secured at one end to the upright 8 in any substantial way and is adjustably connected intermediate of its ends to the upright 7 by means of a set-screw 16, the latter also providing for adjusting the effective tension of the spring 15.

In order to prevent choking of the hopper and a banking of the fertilizer or material therein, arms 17 and 18 are attached to the rotating part 14 and project into the hopper, so as to agitate and stir the material contained therein. The arm 17 is arranged close to the lower portion of the bearing 6, so as to prevent the material adhering thereto. The arm 18 operates close to the inner wall of the bottom 2 to loosen any material that may tend to cling thereto. It will thus be understood that the arms 17 and 18 act both as stirrers or agitators and scrapers.

A clearer 19 is located at the lower end of the bearing 6 and presses lightly upon the upper side of the regulator and spreader 14 and in operation loosens the material and insures a positive discharge thereof. The clearer 19 is inserted in an opening formed in the lower end of the bearing 6 and is pressed downward by means of a spring 20, which is located in the opening receiving the stem of the clearer. The clearer 19 is preferably formed of stout wire, having its lower portion bent to conform to the inclination of the upper side of the part 14, upon which it rides, so as to loosen the material thereon in the rotation of the shaft 13 and the part 14 carried thereby. The spring 20 serves to hold the clearer in contact with the regulator and spreader at all adjusted positions thereof.

The regulator and spreader 14 is preferably arranged below the discharge end of the bottom 2 and is adjustable vertically with the shaft 13 to vary the distance between its top side and the lower end of the rim or flange 4 and which distance or space constitutes the discharge-outlet. For varying the discharge the shaft 13 is adjustable in the bearing 6, said adjustment being effected by means of cams 21 and 22, the latter being fixed and preferably forming a part of the cross-bar 5, whereas the cam 21 is rotatable with reference to the shaft 13 and is mounted thereon. Upon turning the cam 21 it rides upon the cam 22 and effects a vertical or longitudinal adjustment of the shaft 13 and the part 14 fast thereto. The cam 21 obtains a bearing against a suitable stop upon the shaft 13 and which stop is a part of the gear-wheel 12. The adjustable cam 21 is adapted to be secured in the located position in any way commonly provided for securing adjustable parts against movement. In one form an arm 23 projects from the cam 21 and is adapted to coöperate with notches in a bar 24. In the construction shown in Fig. 3 the opposing faces of the cams 21 and 22 are toothed and are adapted to interlock. The arm 23 serves both as a handle for turning the cam 21 and as securing means for making said cam fast in the adjusted position.

The invention is susceptible of various adaptations, according as it is to be used by hand or to be operated by power, and may be provided in the form of a hand-machine or a power-driven implement, according to the nature of the work and the bulk of material to be distributed. Such adaptations will readily suggest themselves in the practicable embodiment of the invention according to the demand and exigencies.

Having thus described the invention, what is claimed as new is—

1. In a device of the character set forth, the combination of a hopper provided in its bottom with a discharge-opening, a vertical shaft provided with a regulator and spreader adapted to adjust the discharge-opening, said shaft mounted to receive both a rotary and a longitudinal or vertical movement, and a cam coöperating with the shaft to adjust the same vertically for varying the effective size of the discharge-opening.

2. In a device of the character specified, the combination of a hopper provided in its bottom with a discharge-opening, a vertical shaft provided with a regulator and spreader for controlling the said discharge-opening, means for rotating the shaft, and coöperating cams concentric with the shaft and adapted to be turned to effect vertical adjustment thereof, whereby the regulator and spreader is moved to vary the size of the discharge-opening.

3. In a device of the character specified, the combination of a hopper provided with a discharge-opening in its lower portion, a support provided with a pendent bearing extended into the hopper, a vertical shaft mounted in said bearing both for rotary and longitudinal movement, a regulator and spreader attached to the lower portion of said shaft and adapted to adjust the size of the discharge-opening, means for rotating the shaft, and coöperating cams concentric with the shaft, the one fast with the bearing and the other loose and adapted to be turned to effect vertical adjustment of the shaft and the regulator and spreader carried thereby.

4. In a device of the character set forth, the combination of a hopper comprising a body portion and a bottom, the latter being of conical form and arranged within the lower portion of the body and housed thereby, a support provided with a pendent bearing extended into the hopper, a vertical shaft mounted in said bearing to receive both a vertical and a rotary movement, a regulator and spreader fitted to said shaft and adapted to control the discharge-opening in the lower portion of the hopper, and coöperating cams concentric with the shaft and adapted to adjust the same vertically, one of the cams being fast with said bearing and the other loose upon the shaft.

5. In combination, a hopper comprising a conical bottom having a discharge-opening at its lower end, a cross-bar secured to the hopper and provided with a pendent bearing, a cam and uprights, a shaft mounted in said bearing both to rotate and move vertically therein, a regulator and spreader at the lower end of the shaft for controlling the discharge-opening, a gear-wheel fast to the upper portion of the shaft, a cam loose upon the shaft and coöperating with the cam forming a part of said cross-bar and adapted to adjust the shaft vertically, means for securing the loose cam in an adjusted position, a horizontal shaft mounted in the uprights of the cross-bar, and a gear-wheel fast to the horizontal shaft and in mesh with the gear-wheel fast to the vertical shaft.

In testimony whereof I affix my signature in presence of two witnesses.

WASHINGTON B. PARRISH. [L. S.]

Witnesses:
R. J. ROYALL,
W. A. FOWLKES.